Sept. 4, 1934.  S. G. BACK  1,972,816
BAGLESS TIRE CURING MOLD
Filed Feb. 8, 1933  2 Sheets-Sheet 1

Samuel G. Back
INVENTOR
BY Victor J. Evans & Co.
ATTORNEY

Sept. 4, 1934.  S. G. BACK  1,972,816
BAGLESS TIRE CURING MOLD
Filed Feb. 8, 1933  2 Sheets-Sheet 2
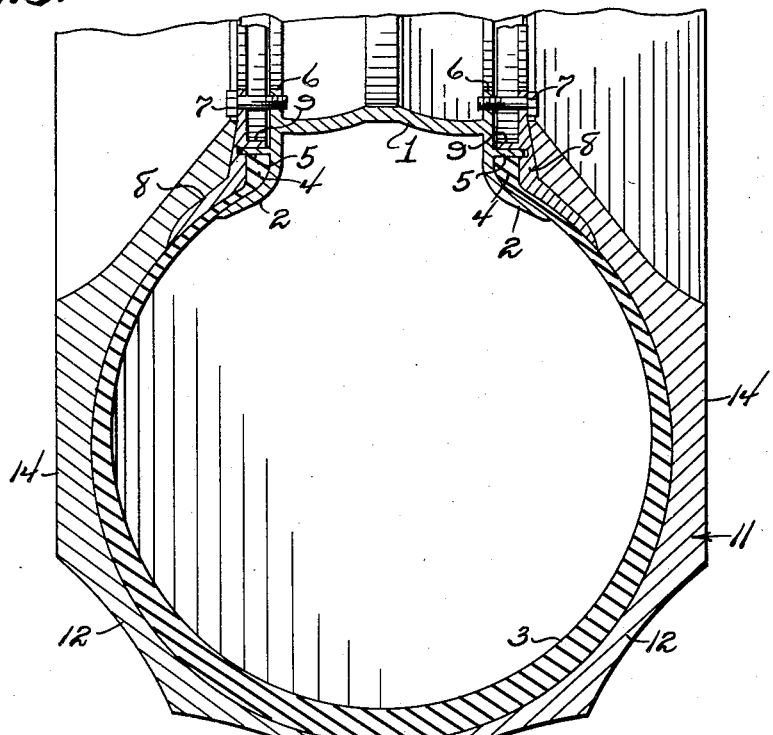
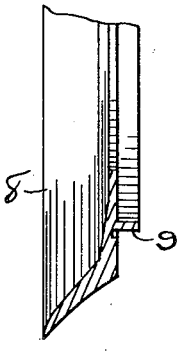
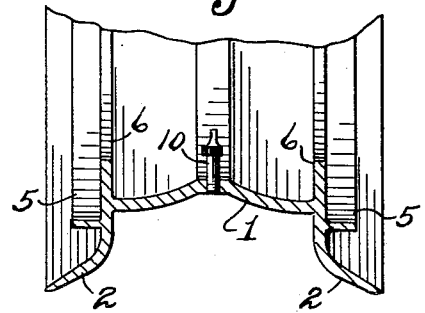
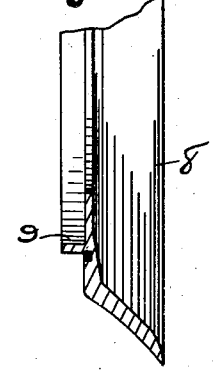
Samuel G. Back
INVENTOR
BY Victor J. Evans & Co.
ATTORNEY Patented Sept. 4, 1934

1,972,816

UNITED STATES PATENT OFFICE 1,972,816

BAGLESS TIRE CURING MOLD

Samuel G. Back, Ashland, Ohio, assignor of one-fourth to Augustus H. Rohleder, Ashland, Ohio Application February 8, 1933, Serial No. 655,826

1 Claim. (Cl. 18—42)

This invention relates to molds especially adaptable for curing tires and has for the primary object, the provision of a device of the above stated character whereby a tire may be efficiently supported during the curing thereof without the employment of an air bag now used in molds of the conventional type and by the elimination of air bags a large saving in cost will be accomplished due to the initial expense of such bags and the short life thereof, the bags being only useful for short periods of time due to their rapid deterioration caused by constant heating and cooling thereof as well as becoming injured or pinched when in the molds.

Another object of this invention is the provision of a mold of the above stated character which may be easily and quickly assembled with a tire therein and will provide an air-tight chamber within the tire so that air pressure introduced therein will maintain the tire against the walls of the mold.

With these and other objects in view this invention consists in certain novel features of construction, combination and arrangement of parts to be hereinafter more fully described and claimed.

For a complete understanding of my invention, reference is to be had to the following description and accompanying drawings, in which.

Figure 3 is a sectional view taken on the line 3—3 of Figure 1.

Figure 4 is a fragmentary sectional view illustrating a rim-like member forming a part of the mold.

Figure 5 is a fragmentary sectional view illustrating one of the outer clamping members.

Figure 6 is a similar view to Figure 5 showing the other or companion clamping member.

Figure 1:
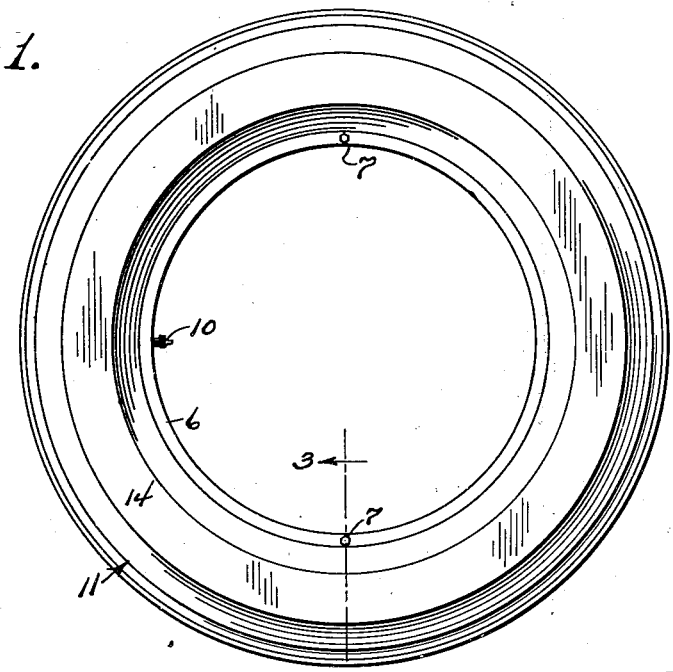
Figure 1 is a side elevation illustrating a mold constructed in accordance with my invention.
Figure 2:
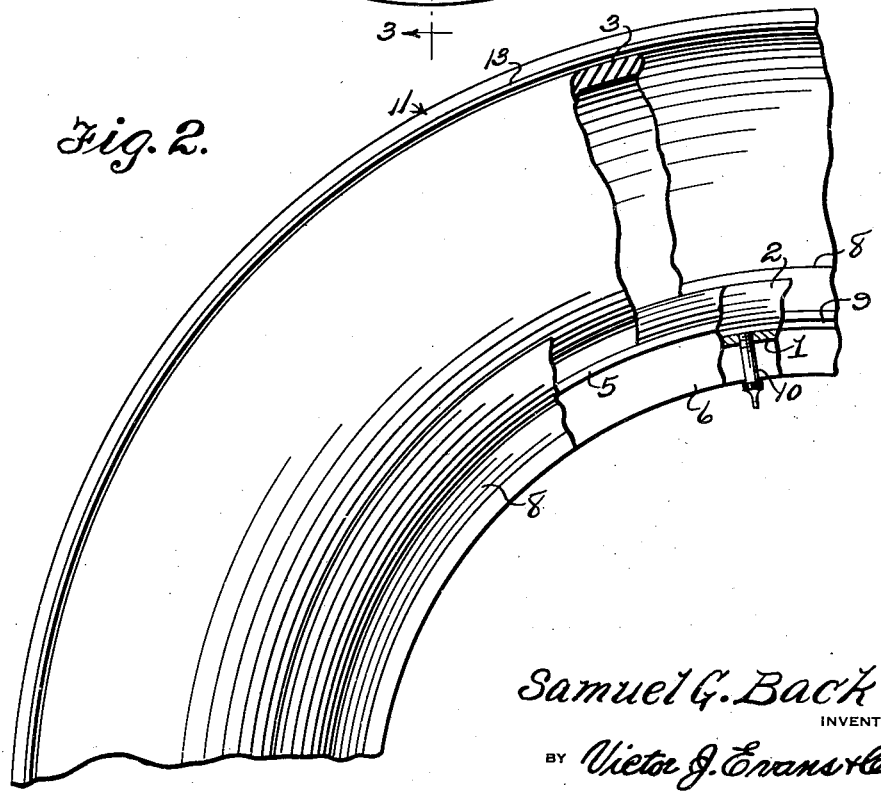
Figure 2 is a fragmentary side elevation partly in section illustrating means of introducing air pressure into the mold and the tire confined therein.

Referring in detail to the drawings, the numeral 1 indicates an annular rim-like member having tire engaging flanges 2 which curve outwardly from each other and are adapted to engage the inner wall of a tire 3 and at the beads 4 of said tire. Annular flanges 5 are formed integrally with the flanges 2 and form seats or rests for the beads 4 of the tire to engage. Annular flanges 6 are formed integrally with the rim-like member 1 and are provided with spaced screw threaded openings to receive stud bolts 7 and the latter are adapted to detachably secure to the rim-like member 1 outer tire engaging members 8. The members 8 are shaped to conform to the contour of the outer walls of the tire adjacent the bead thereof and have formed thereon annular flanges 9 received within the annular flanges 5. The outer tire engaging members 8 are provided with openings to receive the stud bolts 7. Thus it will be seen that the tire at its bead is efficiently clamped to the rim-like member 1 which is provided with an inflating valve 10 so that air pressure may be introduced into the tire.

A mold 11 is provided for the tire and includes companion sections 12, the inner walls of which are curved to conform to the contour of the outer walls of the tire. The companion sections 12 at one end are provided with overlapping flanges 13, while said sections adjacent their other edges are recessed to receive the outer tire engaging elements 8. The sections of the mold are provided with flattened faces 14 to permit gripping of said section by a suitable vise or holder to maintain the sections of the mold about the tire during the curing thereof.

From the foregoing description it will be seen that the tire when assembled within the sections of the mold and applied to the rim-like member, an air-tight chamber is provided within the tire so that air pressure may be introduced therein for causing the tire to conform to the walls of the mold sections, thereby eliminating the use of air bags.

While I have shown and described the preferred embodiment of my invention, it will be understood that minor changes in construction, combination and arrangement of parts may be made without departing from the spirit and scope of my invention, as claimed.

Having described the invention, I claim:

A tire mold comprising mold sections adapted to enclose a tire and to engage with each other over the tread of the tire, outer clamping members received between the mold sections and the tire and having retaining grooves, a rim-like member arranged between the outer clamping members and detachably secured thereto and adapted to engage inner walls of the tire, flanges integral with the rim-like member and fitting in the grooves and providing seats to be engaged by the tire, and flanges on the outer clamping members and contacting with the first-mentioned flanges.

SAMUEL G. BACK.